(12) United States Patent
Hertzog et al.

(10) Patent No.: US 11,602,094 B2
(45) Date of Patent: Mar. 14, 2023

(54) PLOUGH

(71) Applicant: CNH Industrial America LLC, New Holland, PA (US)

(72) Inventors: Daniel Hertzog, Blackstad (SE); Bengt Per-Inge Linderson, Odensvi (SE); Per Dennis Wallin, Västervik (SE); Carl Ola Fredrik Nilsson, Västervik (SE); Robert Svensson, Loftahammar (SE); Rickard Karl Gustav Nåhdin, Gamleby (SE)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 160 days.

(21) Appl. No.: 16/849,359

(22) Filed: Apr. 15, 2020

(65) Prior Publication Data

US 2020/0337211 A1    Oct. 29, 2020

(30) Foreign Application Priority Data

Apr. 25, 2019 (EP) ................................ 19171141

(51) Int. Cl.
| | | |
|---|---|---|
| *A01B 79/00* | (2006.01) | |
| *A01B 3/34* | (2006.01) | |
| *A01B 63/00* | (2006.01) | |
| *A01B 63/16* | (2006.01) | |
| *A01B 63/24* | (2006.01) | |

(52) U.S. Cl.
CPC ........... *A01B 79/005* (2013.01); *A01B 3/34* (2013.01); *A01B 63/008* (2013.01); *A01B 63/16* (2013.01); *A01B 63/24* (2013.01)

(58) Field of Classification Search
CPC .......... A01B 79/005; A01B 3/16; A01B 3/22; A01B 3/28; A01B 3/30; A01B 3/34; A01B 63/008; A01B 63/24
USPC .............................................. 172/4, 702–706
See application file for complete search history.

(56) References Cited

U.S. PATENT DOCUMENTS

| | | | | |
|---|---|---|---|---|
| 4,093,248 A | * | 6/1978 | Gassner et al. ........ | A01B 3/464 172/2 |
| 4,667,744 A | * | 5/1987 | Kauss et al. ........... | B62D 49/08 172/2 |
| 5,992,533 A | * | 11/1999 | Scarlett et al. ...... | A01B 79/005 172/2 |
| 6,547,012 B2 | * | 4/2003 | Scarlett et al. ........ | A01B 67/00 172/1 |

(Continued)

FOREIGN PATENT DOCUMENTS

| | | |
|---|---|---|
| AU | 2006202183 A1 | 12/2007 |
| DE | 10120733 A1 | 10/2002 |
| FR | 2881608 A1 * | 8/2006 ........... A01B 79/005 |

OTHER PUBLICATIONS

Extended European Search Report for EP Application 19171141.5 dated Nov. 6, 2019 (seven pages).

*Primary Examiner* — Tara Mayo-Pinnock
(74) *Attorney, Agent, or Firm* — Rebecca Henkel; Rickard DeMille

(57) ABSTRACT

A plough comprising: a plough body; an actuator mechanism that is configured to adjust a pitch angle of the plough body; and a controller. The controller is configured to: determine an actuator-control-signal for setting the pitch angle of the plough body based on control-data; and provide the actuator-control-signal to the actuator mechanism.

14 Claims, 7 Drawing Sheets

(56) References Cited

U.S. PATENT DOCUMENTS 7,588,089 B2 * 9/2009 Guo et al. ............ A01B 59/069
172/465
2018/0035597 A1 2/2018 Achen et al.

* cited by examiner

PLOUGH

BACKGROUND OF THE INVENTION

The present disclosure relates to an agricultural plough and a method of operating a plough.

In agriculture, farming cycles are followed that can roughly be divided into the different steps of land preparation, seed sowing, fertilizing, irrigation, crop growth, and harvesting. Each of these steps is critical to yield optimal crop results and achieve the desired returns on initial investments. Of the listed steps, land preparation is typically further divided into steps of, as necessary, clearing obstructions (e.g. bushes, stones and rocks) and subsequent tillage.

Tilling crumbles and loosens the soil, improves the soil structure and incorporates crop residues and manure into the soil, thus fertilizing the ground. The improved soil structure allows for increased plant root growth, soil aeration and water penetration/filtration. Overall this results in higher yields, better long-term soil fertility, soil moisture retention, and weed management. Tillage can be separated into primary (relatively deep) and secondary (relatively shallow) tillage. In primary tillage, such as ploughing, the soil is turned over such that nutrients come to the surface. In addition to turning up the soil to bring fresh nutrients to the top and depositing plant residue below where it will break down, this process also aerates the earth—enabling it to hold more moisture. Preparing the land to a greater depth produces a rougher surface finish than secondary tillage. Secondary tillage (e.g. seedbed cultivation) breaks up soil clods into smaller masses which might be desirable for small seeds or plants that have minimal clod-handling ability.

Primary tillage, and particularly ploughing, is widely regarded as one of the most effective ways of preventing crop disease, removing weeds, and controlling mice and other pests. In its simplest form the turnplough, also known as the mouldboard plough, includes a variety of plough bodies, which are blades for penetrating and turning over the soil in arrays of adjacent trenches, known as furrows. Modern ploughs typically include a plurality of plough bodies connected to a plough frame such that they are laterally offset from each other when the plough is in use. Each plough body is connected to the plough frame via corresponding beams. The plough frame, in turn, is connected to a towing or pushing vehicle via a hitch arranged at a front or back end of the frame.

Depending on the density of the soil, a working depth of the plough bodies can be adjusted. For instance, the plough bodies working depth may be shallow in harder (dense) soils, whereas a deeper working depth may be applied in softer (less dense) soils. The plough bodies can be rigidly attached to the main frame, such that their distance from the main frame remains constant. Accordingly, the working depth of the ploughs are then adjusted by varying the ground clearance of the main frame. If the main frame is brought closer to the ground surface, the ground clearance is reduced, and the plough bodies penetrate deeper into the soil. Similarly, if the main frame is lifted further off the ground, the ground clearance is increased and the plough bodies are raised, thereby reducing the working depth.

The ground clearance of the main frame may be controlled by one or more depth wheels. The one or more depth wheels may be connected to any part of the main frame such as the rear end of the main frame. An adjustable linkage may be provided between the main frame and the depth wheel to allow for changes in the distance between the depth wheel and the main frame. During ploughing, the depth wheel runs on the ground surface and supports the weight of the plough. If the distance between the depth wheel and the main frame is reduced, then the ground clearance between the main frame and the ground surface reduces accordingly. On the other hand, if the distance between the depth wheel and the main frame is increased, the ground clearance of the main frame increases. As outlined before, changing the main frame's ground clearance results in a variation of the plough body working depth.

Most modern ploughs are of the reversible type, in which the main frame is rotatable by 180 degrees or about 180 degrees (i.e. reversed), with respect to the headstock. A turning cylinder attached to the headstock may be used to rotate (reverse) the plough. During rotation of the main frame, a first set of plough bodies, which was initially arranged below the main frame (first configuration), is transferred to the top of the main frame. At the same time, a second set of plough bodies, which was initially arranged on top of the main frame, is then transferred to a position below the main frame. The reversible plough is then in its second configuration. The main frame may be repeatedly rotated (reversed) between the first and second configuration, particularly during turning manoeuvres on the headlands. Whenever the plough is reversed, the first and second set of plough bodies swap position.

In reversible ploughs, a means of adjusting the working depth of the plough bodies (i.e. the main frame) is required for both configurations of the reversible plough. There are mainly two types of depth control wheels for reversible ploughs. A first type includes a single pivoting depth wheel, which is used in both configurations of the reversible plough. The single pivoting depth wheel has to be moved from one side of the main frame to the other during reversal. This side transfer of the single depth wheel may be achieved by swinging the latter from one side to the other.

A second solution avoids the need for a movement of the depth adjustment wheel from one side to the other. In this second alternative, two separate depth wheels may be fixed to the main frame. A first depth wheel can be arranged on a first side of the main frame and a second depth wheel may be arranged on the second, opposite side of the main frame. Each of the two wheels is then only utilised in one configuration of the plough.

SUMMARY OF THE INVENTION

Aspects and embodiments of the disclosure provide an agricultural implement as claimed in the appended claims.

According to one aspect of the current disclosure, there is provided a plough comprising:

a plough body;

an actuator mechanism that is configured to adjust a pitch angle of the plough body; and a controller that is configured to:

determine an actuator-control-signal for setting the pitch angle of the plough body based on control-data; and provide the actuator-control-signal to the actuator mechanism.

Setting the pitch angle of the plough body in this way can advantageously enable the vertical force experienced by the plough bodies to be controlled. For instance, if a vertical downwards force on the plough body were to be too great then the entire plough can be pulled downwards such that the force exerted by a depth wheel on the ground can be too high. If a vertical upwards force on the plough body were to be too great, or a vertical downwards force on the plough body were to be too small, then the plough body can be susceptible to moving upwards if it experiences a change in ploughing conditions, such as soil density. That is, the plough body can be overly sensitive to changes in ploughing conditions such that it too easily moves upwards away from its intended working depth.

The plough body may be rotatable about an axis that is transverse to the direction of travel of the plough.

The control-data may comprise vertical-force-data, which is representative of an upwards or downwards force experienced by the plough body as it is working in a field.

The plough may further comprise a force-sensor associated with the plough body. The force-sensor may be configured to provide the vertical-force-data.

The plough may further comprise a ground-engaging-wheel-sensor associated with a ground-engaging wheel of the plough. The ground-engaging-wheel-sensor may be configured to provide the vertical-force-data.

The plough may further comprise: a hitch for coupling the plough to an agricultural vehicle; and a hitch-sensor associated with the hitch, wherein the hitch-sensor is configured to provide the vertical-force-data.

The controller may be is configured to:
receive sensor-signals from more than one of a force-sensor, a ground-engaging-wheel-sensor, and a hitch-sensor; and
combine those signals in order to determine the vertical-force-data.

The control-data may comprise depth-control-data that is representative of an instruction to change the depth of the plough body relative to a ground surface on which the plough is operating. The controller may be configured to determine the actuator-control-signal based on the depth-control-data in order to:
increase the pitch angle of the plough body if the depth-control-data represents an instruction to increase the depth of the plough body relative to a ground surface; and
decrease the pitch angle of the plough body if the depth-control-data represents an instruction to decrease the depth of the plough body relative to a ground surface.

The control-data may comprise field-location-data that represents one or more properties of a field in which the plough is operating. The field-location-data may comprise one or more of:
(i) field-boundary-location-data that defines the boundaries of the field that is to be ploughed,
(ii) headland-boundary-location-data that defines the location of one or more headlands in the field that is to be ploughed, and
(iii) obstacle-location-data that defines the locations of obstacles in the field.

The actuator-control-signal may be is configured to set the pitch angle of the plough body such that an upwards or downwards force experienced by the plough body is higher than a lower-force-threshold and/or lower than an upper-force threshold. The upper-force-threshold may represent a maximum downwards force on the plough body. The lower-force threshold may represent a minimum downwards force on the plough body or a maximum upwards force on the plough body.

The plough may further comprise: a frame; and a beam. The plough body may be connected to the frame by the beam. The plough body may be rotatably connected to the beam. The actuator mechanism may be configured to adjust the pitch angle of the plough body by rotating it relative to the beam.

There is also disclosed a computer-implemented method of operating a plough, the plough comprising:
a plough body;
an actuator mechanism that is configured to adjust a pitch angle of the plough body; wherein the method comprises:
determining an actuator-control-signal for setting the pitch angle of the plough body based on control-data; and
providing the actuator-control-signal to the actuator mechanism.

The plough may be a reversible plough.

There may be provided an agricultural machinery comprising an agricultural vehicle and any plough disclosed herein, wherein the agricultural vehicle is for driving the plough. The plough may be connected to the front or the rear of the agricultural vehicle.

There may be provided a computer program, which when run on a computer, causes the computer to configure any apparatus, including a controller, disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present disclosure will now be described by way of example only, with reference to the accompanying drawings, in which.

DETAILED DESCRIPTION OF THE DRAWINGS

Figure 1A:
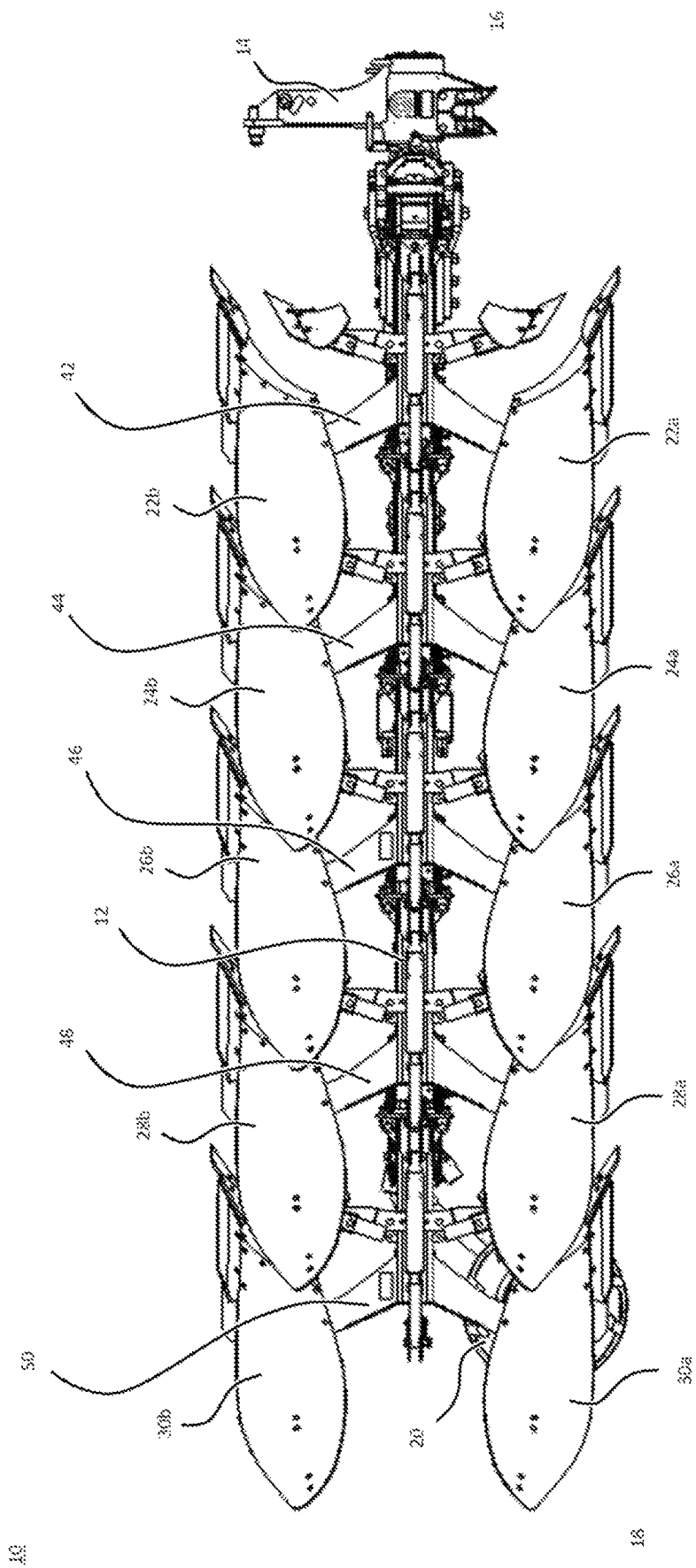
FIG. 1A shows a right-side view of an agricultural implement with fixed ground engaging tools.
Figure 1B:
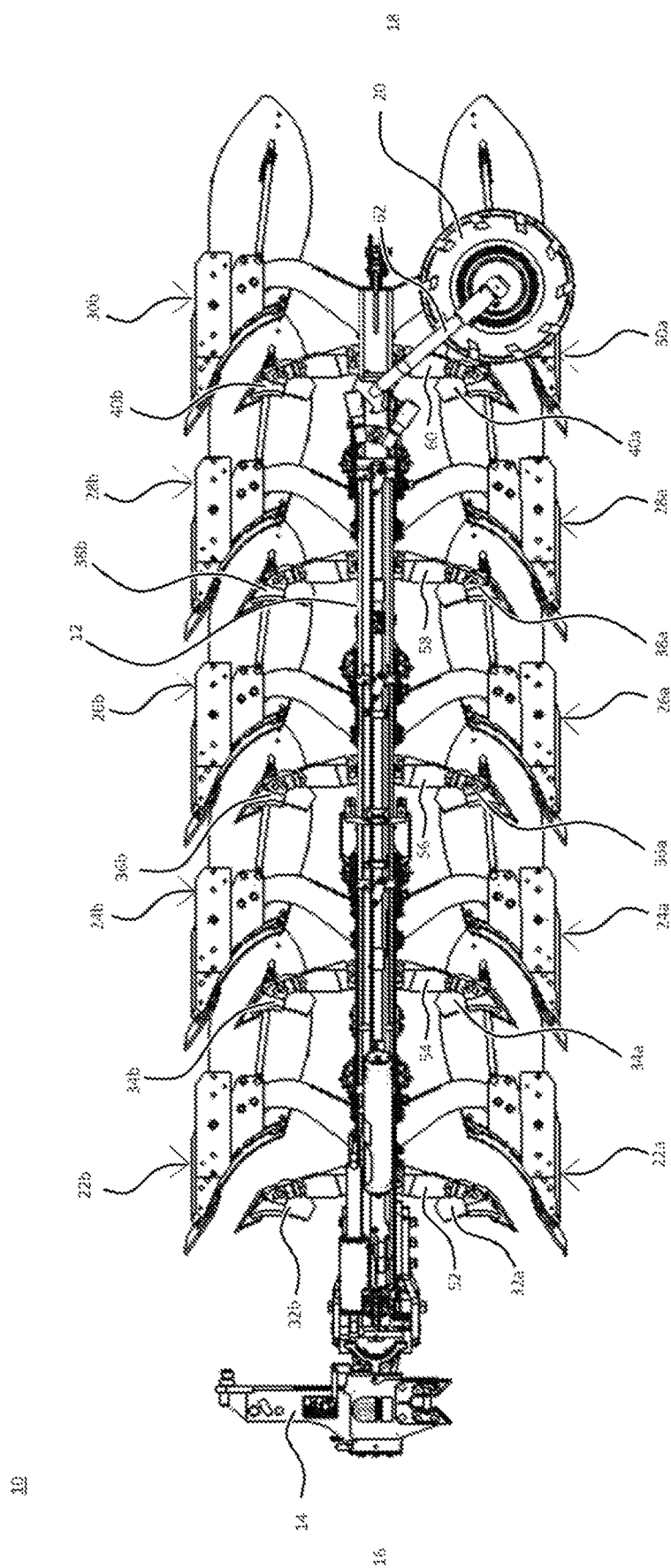
FIG. 1B shows a left-side view of the agricultural implement shown in FIG. 1A.
Figure 1C:
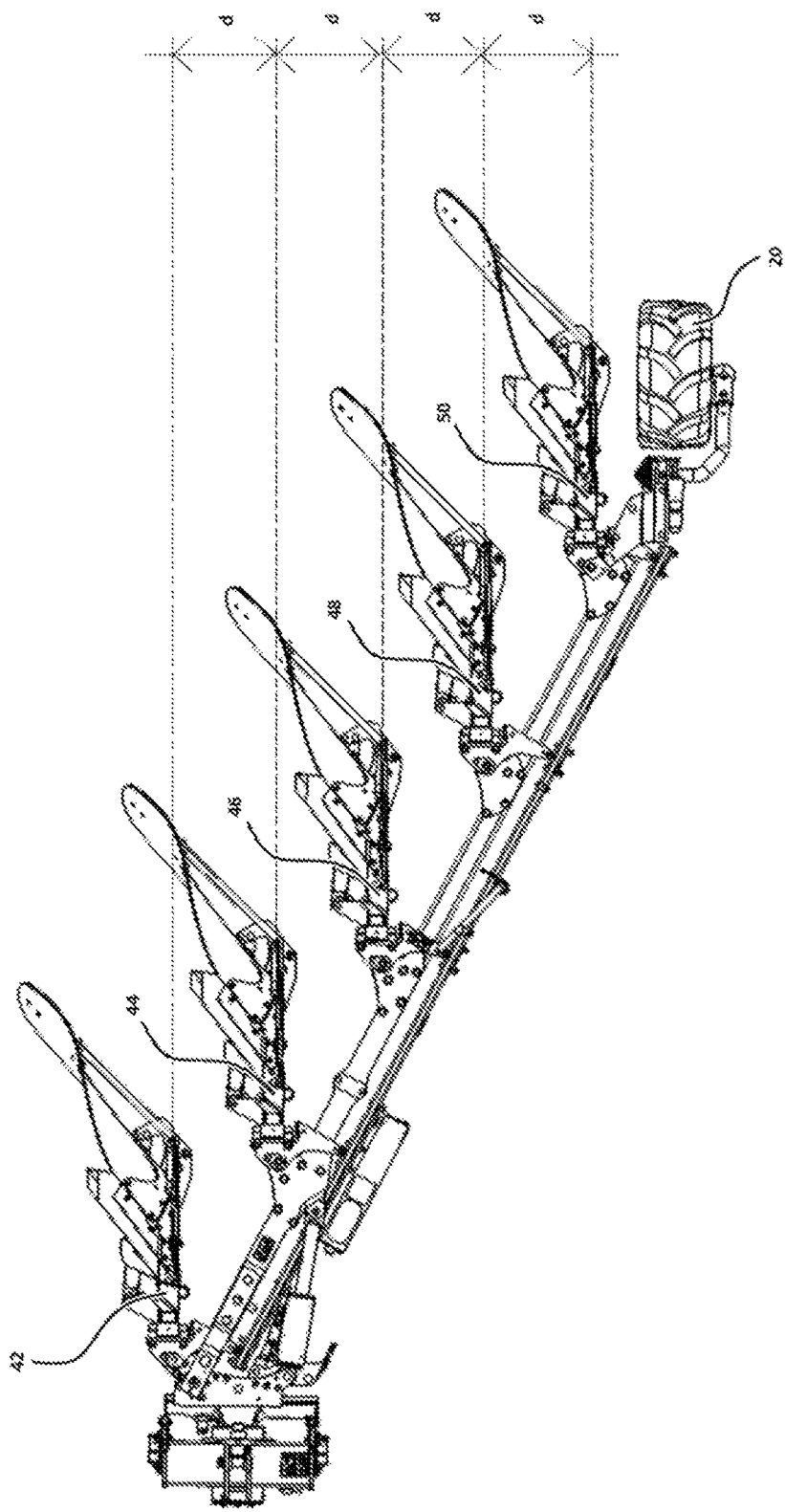
FIG. 1C shows a plan view of the agricultural implement shown in FIG. 1A.

FIGS. 1A to 1C show various views of an agricultural implement, particularly a plough 10. As will be described in more detail below, the plough 10 shown in FIGS. 1A to 1C is a reversible plough.

The plough 10 comprises a main frame 12. The main frame 12 may be a rectangular or round tube extending between a headstock 14 at a front end 16 of the plough towards a depth wheel 20 at a rear end 18 of the plough. The main frame 12 supports a variety of ground-engaging tools.

In the example of FIGS. 1A to 1C, the ground engaging tools include plough bodies 22a, 22b, 24a, 24b, 26a, 26b, 28a, 28b, 30a, 30b and plough skimmers 32a, 32b, 34a, 34b, 36a, 36b, 38a, 38b, 40a, 40b. A plurality of first ground engaging tools, i.e. plough bodies 22a, 24a, 26a, 28a, 30a and skimmers 32a, 34a, 36a, 38a, and 40a, are arranged on a first side of the main frame 12. In a first configuration of the main frame 12, illustrated in FIGS. 1A to 1C, the plurality of first ground engaging tools are arranged below the main frame 12.

A plurality of second ground engaging tools, i.e. plough bodies 22b, 24b, 26b, 28b, 30b and skimmers 32b, 34b, 36b, 38b, and 40b, are arranged on a second side of the main frame 12, opposite to the plurality of first ground engaging tools. In the first configuration of the main frame 12, illustrated in FIGS. 1A to 1C, the plurality of second ground engaging tools are arranged above the main frame.

Each of the plough bodies 22a, 22b, 24a, 24b, 26a, 26b, 28a, 28b, 30a, 30b is connected to the main frame 12 by means of beams 42, 44, 46, 48, 50. Each of the beams 42, 44, 46, 48, 50 has a substantially Y-shaped structure.

A first beam 42 supports a first pair of plough bodies 22a, 22b. A second beam 44 supports a second pair of plough bodies 24a, 24b. A third beam 46 supports a third pair of plough bodies 26a, 26b. A fourth beam 48 supports a fourth pair of plough bodies 28a, 28b. A fifth beam 50 supports a fifth pair of plough bodies 30a, 30b.

Each of the pairs of plough bodies 22a, 22b, 24a, 24b, 26a, 26b, 28a, 28b, 30a, 30b is designed to create a furrow in the field when the plough is dragged behind or pushed by an agricultural vehicle such as a tractor. It follows that each run of the illustrated plough 10 through a field creates five adjacent furrows.

A first mounting rail 52 supports a first pair of skimmers 32a, 32b. A second mounting rail 54 supports a second pair of skimmers 34a, 34b. A third mounting rail 56 supports a third pair of skimmers 36a, 36b. A fourth mounting rail 58 supports a fourth pair of skimmers 38a, 38b. A fifth mounting rail 60 supports a fifth pair of skimmers 40a, 40b. The skimmers 32a, 32b, 34a, 34b, 36a, 36b, 38a, 38b, 40a, 40b and/or their respective mounting rails 52, 54, 56, 58, 60 may be adjustable with respect to the main frame 12 to change the distance between the skimmers 32a, 32b, 34a, 34b, 36a, 36b, 38a, 38b, 40a, 40b and the main frame 12. In one example, the skimmers 32a, 32b, 34a, 34b, 36a, 36b, 38a, 38b, 40a, 40b may be movable up and down towards and away from the main frame 12 to individually adjust the working depth of each of skimmers 32a, 32b, 34a, 34b, 36a, 36b, 38a, 38b, 40a, 40b. The skimmers 32a, 32b, 34a, 34b, 36a, 36b, 38a, 38b, 40a, 40b may either be manually or automatically adjustable.

Figure 2:
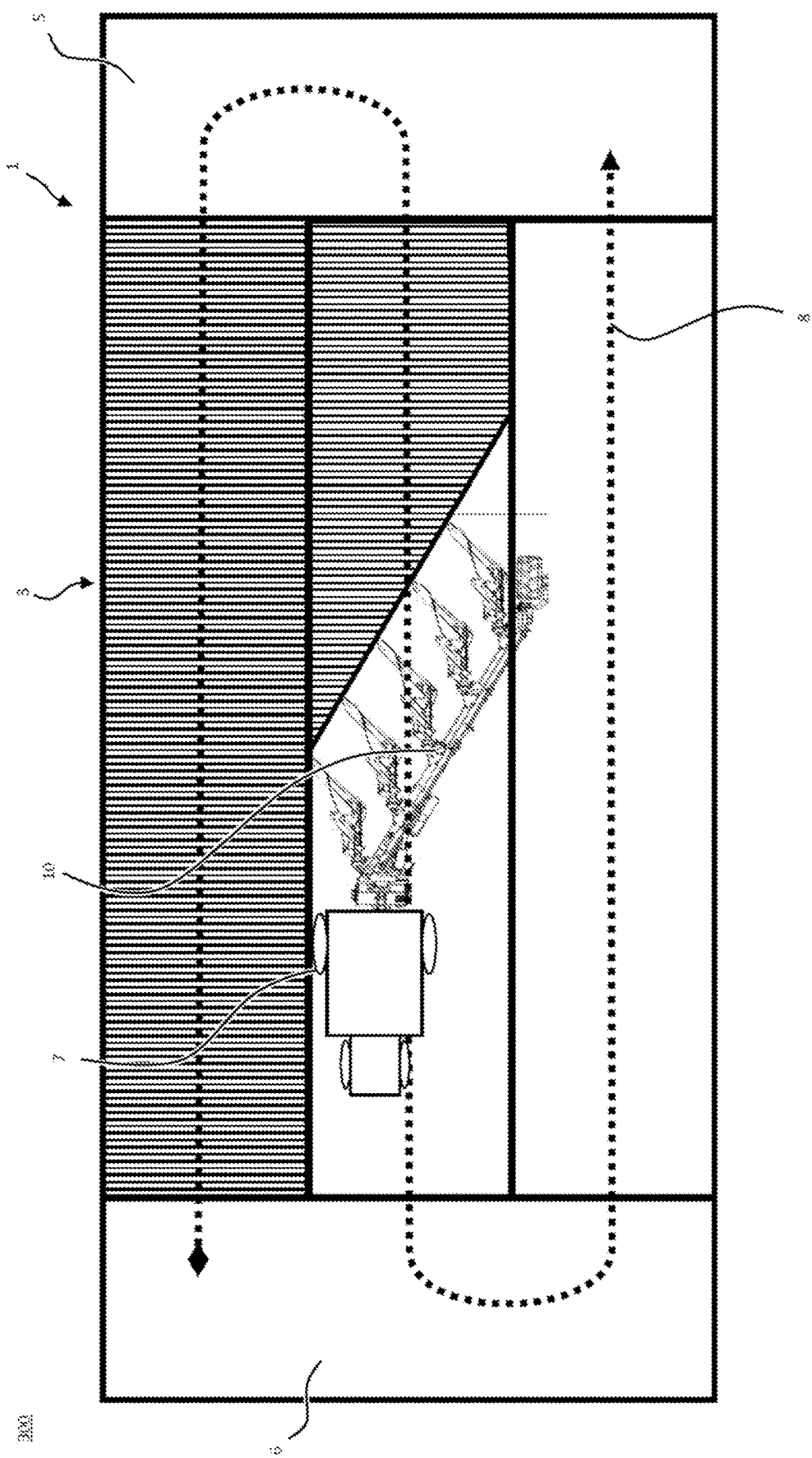
FIG. 2 shows a schematic representation of the trajectory of an agricultural machinery within a work area.

Turning to FIG. 2, a typical operation of an agricultural machinery comprising a tractor 7 and a plough 10 is described. In use, the plough 10 is drawn as an attachment (implement) behind an agricultural towing vehicle (e.g. tractor 7). It will be appreciated that it is equivalently feasible to locate the plough 10 in front of or both in front of and behind the tractor 7.

FIG. 2 shows a schematic work area 1, e.g. a crop field, which is divided into a main field 3 and headlands 5,6. A tractor 7 draws the plough 10 across the main field 3 in generally parallel working rows. The working rows are part of the trajectory 8 of the tractor 7 and typically run in parallel with a long edge of the work area 1. Each working row represents an individual run of the agricultural machinery across the field between headlands 5 and 6. As will be described in more detail below, a five-furrow plough, such as the exemplary plough shown in FIGS. 1A to 1C creates a total of five furrows per run.

At the end of each run/working row, the tractor 7 and plough 10 use the upcoming headland 5 or 6 for turning around, as indicated by trajectory 8. It is known in the art that the soil of the headlands 5, 6 is subject to greater levels of soil compaction as it receives more traffic per unit area than the main field 3. In order not to disturb the soil of the headlands 5, 6 more than necessary, it is known to lift the ground engaging tools, such as the plough bodies and the skimmers, off the ground into a headland or transfer position, just before the plough 10 reaches the headlands 5 or 6 respectively. Once the tractor 7 and the corresponding plough 10 have turned on the headland 5, 6, the ground engaging tools of the plough 10 are, again, lowered towards an operating position to engage the soil of the main field 3.

In the illustration of FIG. 2, the plough 10 is working on the main field 3 and, therefore, is arranged in the operating position. As the plough 10 reaches the border between the headland 5/6 and the main field 3, the plough 10 is transferred to a headland/transfer position. It follows that each working row starts with an adjustment of the plough from the transfer position into the operating position and ends with an adjustment of the plough from the operating position into the transfer position.

The plough 10 shown in FIGS. 1A to 1C is of the fully-mounted type. In fully-mounted ploughs, the weight of the plough is carried exclusively by the tractor when the plough is in its transfer position (on the headlands). In other words, the plough is then exclusively supported by the tractor 7 via headstock 14 and may be lifted off the ground with a lift cylinder of a tractor linkage.

During the turning movement on the headlands, the plough 10 is also reversed. That is, the main frame 12 is rotated by about 180 degrees with respect to the headstock 14 to move the plough from a first configuration to a second configuration. It will be appreciated that if the operator is ploughing in the furrow, then the main frame 12 may not be rotated by exactly 180 degrees, it is more likely to be 190-200 degrees or 160-170 degrees depending on which direction the main frame 12 turns. If operator is ploughing on-land, then the main frame 12 may be rotated by an angle that is closer to 180 degrees, perhaps exactly 180 degrees.

In its first configuration shown in FIGS. 1A to 1C, the plough 10 is set up such that plough bodies 22a, 24a, 26a, 28a, and 30a of each of the pairs are in contact with the soil. This first configuration is shown in FIG. 2 and sometimes referred to as the "right turning configuration", since the mouldboards of the plough bodies 22a, 24a, 26a, 28a and 30a are arranged to move the soil sideways from left to right when viewed in the direction of travel. In its second configuration (not illustrated), the plough 10 is set up such that plough bodies 22b, 24b, 26b, 28b, and 30b of each of the pairs are in contact with the soil. This second configuration is achieved after rotating the main frame by 180 degrees, such that the majority of plough bodies are arranged to the right of the tractor (not shown). It follows that the second configuration is also referred to as the "left turning configuration".

Tilling the field with the plough 10 in this first configuration provides a first furrow created by the first plough body 22a, a second furrow created by the second plough body 24a, a third furrow created by the third plough body 26a, a fourth furrow created by the fourth plough body 28a, and a fifth furrow created by the fifth plough body 30a. A furrow width is determined by the lateral distance d between the plough bodies 22a, 22b, 24a, 24b, 26a, 26b, 28a, 28b, 30a, 30b, as illustrated in FIG. 1C.

As the reversible plough 10 reaches the end of the first run, the main frame 12 is rotated by 180 degrees (reversed) with respect to the headstock 14. A turning cylinder (not shown), attached to the headstock 14 may be used to rotate (reverse) the plough 10. During rotation of the main frame, the first plurality of plough bodies, e.g. 22a, 24a, 26a, 28a, 30a, are transferred to the top of the plough 10. At the same time, the second plurality of plough bodies e.g. 22b, 24b, 26b, 28b, 30b, which were not in use in the previous run, is then transferred to the lower end of the plough 10 and will be submerged in the soil during the next run. The reversible plough is then in its second configuration (not shown).

Executing a second run of the field with the plough 10 in this second configuration provides a first furrow created by the sixth plough body 22b, a second furrow created by the seventh plough body 24b, a third furrow created by the eighth plough body 26b, a fourth furrow created by the ninth plough body 28b, and a fifth furrow created by the tenth plough body 30b.

Reversing the plough 10 between consecutive runs has the advantage that the plough bodies 22a, 22b, 24a, 24b, 26a, 26b, 28a, 28b, 30a, 30b that engage the soil always face the same side edge of the main field 3, irrespective of the tractor's orientation.

In both configurations of the plough 10 the main frame 12 is supported by a depth wheel 20. The depth wheel 20 is arranged at the back end 18 of the plough 10. Since the plough bodies 22a, 22b, 24a, 24b, 26a, 26b, 28a, 28b, 30a, 30b and the skimmers 32a, 32b, 34a, 34b, 36a, 36b, 38a, 38b, 40a, 40b are generally fixed to the main frame via beams 42, 44 46, 48 and 50, there is no possibility of adjusting the working depth of said ground engaging tools without changing the ground clearance of the main frame 12. To this end, the plough 10 shown in FIGS. 1A to 1C includes depth wheel 20, which acts as a depth wheel to adjust the ground clearance of the main frame 12. An adjustable linkage 62 provided between the depth wheel 20 and the main frame 12 allows the operator to lift or lower the main frame 12 with respect to a ground surface. Since the position of the plurality of first and second ground engaging tools is fixed with respect to the main frame 12, any change in the main frame's ground clearance will also affect the working depth of the plurality first and second ground engaging tools. In particular, if the main frame 12 is lowered by adjusting the link between the depth wheel 20 and the main frame 12, then the working depth of the plurality of first ground engaging tools shown in FIGS. 1A to 1C is increased, i.e. the plurality of first ground engaging tools are lowered further into the soil. If, on the other hand, the main frame 12 is lifted, then the working depth of the plurality of first ground engaging tools is decreased, i.e. the plurality of first ground engagement tools are raised.

Figure 3:
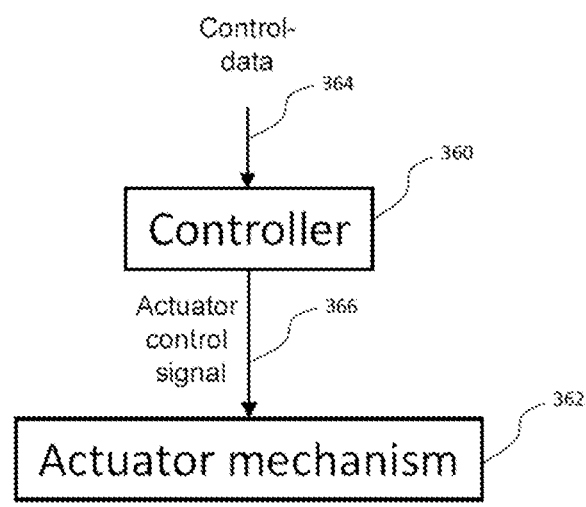
FIG. 3 schematically shows part of a plough, that includes a controller and an actuator mechanism.

FIG. 3 schematically shows part of a plough, that includes a controller 360 and an actuator mechanism 362. The plough also includes a plough body that is not shown in FIG. 3. The plough body is rotatable/pivotable about an axis that is transverse to the direction of travel of the plough such that a pitch angle of the plough body can be adjusted. The plough body can be rotatable relative to a beam or a frame of the plough, or some other part of the plough. The actuator mechanism 362 is for adjusting the pitch angle of the plough body. In this way, the actuator mechanism 362 can change the orientation of the plough body with respect to the ground surface. An example implementation of the actuator mechanism is described below with reference to FIGS. 4A-4C and 5A-5C.

The controller 360 determines an actuator-control-signal 366 for setting the pitch angle of the plough body based on received control-data 364. The controller 360 can then provide the actuator-control-signal 366 to the actuator mechanism 362 such that the pitch angle of the plough body is automatically adjusted. The pitch angle can be defined as the angle between a horizontal plane and a longitudinal axis of the plough body. The pitch angle can be increased by rotating the plough body such that a point of the plough body is lowered. The pitch angle can be decreased by rotating the plough body such that the point of the plough body is raised. Adjusting the pitch angle of the plough body will affect the amount of lift/downforce that is experienced by the plough body as it moves through the soil. That is, an increase in the pitch angle of the plough body will increase a downwards force experienced by the plough body. Similarly, a decrease in the pitch angle of the plough body will decrease the downwards force experienced by the plough body.

In some examples, it can be beneficial for the vertical force experienced by the plough bodies to be higher than a lower-force-threshold, and/or less than an upper-force threshold. For instance, if a vertical downwards force on the plough body were to be too great (which can be considered as higher than an upper-force-threshold), then the entire plough can be pulled downwards such that the force exerted by the depth wheel on the ground can be too high. In this case, the depth wheel may get stuck in the soil thereby hindering forward movement of the plough and potentially requiring extra energy from a driving vehicle to tow/push the plough. Also, the additional force exerted on the ground by the depth wheel may unduly compact the soil over which it passes. In this way, the upper-force-threshold can represent a maximum downwards force on the plough body, If a vertical upwards force on the plough body were to be too great or a vertical downwards force on the plough body were to be too small (both of which can be considered as less than a lower-force-threshold), then the plough body can be susceptible to moving upwards if it experiences a change in ploughing conditions, such as soil density. That is, the plough body can be overly sensitive to changes in ploughing conditions such that it too easily moves upwards away from its intended working depth. In this way, the lower-force threshold can represent a minimum downwards force on the plough body or a maximum upwards force on the plough body.

In one example, the control-data can include vertical-force-data, which is representative of an upwards or downwards force experienced by the plough body. The plough may comprise a force-sensor, that is associated either directly or indirectly with the plough body to provide the vertical-force-data. For instance, the force-sensor may determine a force experienced by a beam or a stone trip mechanism that is associated with the plough body. In some examples, a ground-engaging-wheel-sensor that is associated with a ground-engaging wheel of the plough can provide the vertical-force-data. For instance the ground-engaging-wheel-sensor may determine the vertical-force-data based on a tyre pressure of the depth wheel. As another example, the ground-engaging-wheel-sensor may determine the vertical-force-data based on a pressure of fluid in a hydraulic circuit that includes a cylinder as part of a depth wheel adjustable linkage. Both of these example pressure values can be used to determine the vertical force that is being applied to the plough bodies as they move through the soil.

Optionally, a hitch-sensor can be associated with a hitch such that it can provide the vertical-force-data. The hitch is for coupling the plough to a driving agricultural vehicle such as a tractor. The hitch-sensor may determine the vertical-force-data based on a pressure of fluid in a hydraulic circuit that includes a lift cylinder for raising or lowering the headstock of the plough relative to the tractor.

In some examples, the controller 360 may receive signals from a plurality of different types of sensors, and may combine those signals in order to determine the vertical-force-data. This can provide an advantage by controlling the pitch of the plough bodies in order to ensure that there is a preferred amount of pressure on the ground-engaging-wheel to secure the desired working depth of the plough bodies. The preferred amount of pressure may be a minimum amount of pressure.

As indicated above, the controller 360 can determine the actuator-control-signal 366 to set the pitch angle of the plough body such that an upwards or downwards force experienced by the plough body is less than a lower-force-threshold, and/or higher than an upper-force threshold. That is, the received vertical-force-data can be used as feedback to ensure that the vertical force experienced by the plough body is within a range of values. In this way, the downforce/lift experienced by the plough body can be set such that the ploughing operation can be performed with improved fuel efficiency (because downforce may not be so great that significant extra energy is required to move the plough through the field) and/or an improved consistency of plough furrows (because it is less likely that the plough body will raise from its intended ploughing depth during use).

In some examples, the control-data 364 can include depth-control-data that is representative of an instruction to change the depth of the plough body relative to a ground surface on which the plough is operating. Such depth-control-data can be determined from user input or an automatic control algorithm that is provided as part of a known ploughing operation, such as part of a headland routine where the plough bodies are raised out of the soil at the end of a run through the field and then reinserted for the next run. In such examples, the actuator-control-signal 366 can set the pitch angle of the plough body such that it experiences a vertical force that assists with the intended change in depth of the plough body.

The controller can determine the actuator-control-signal 366 based on the depth-control-data in order to: (i) increase the pitch angle of the plough body if the depth-control-data represents an instruction to increase the depth of the plough body relative to a ground surface; and/or (ii) decrease the pitch angle of the plough body if the depth-control-data represents an instruction to decrease the depth of the plough body relative to a ground surface. This can improve the fuel efficiency of the tractor that is driving the plough because it can require less energy to raise or lower the plough body. In such examples, the actuator-control-signal 366 can be provided to the actuator mechanism 362 such that it operates in parallel with another actuator for adjusting the depth of the plough bodies, such as the lift cylinder and/or the depth wheel adjustable linkage.

In some examples, the control-data can include: field-location-data that represents one or more properties of a field in which the plough is operating; and plough-location-data that that represents the location of the plough. More particularly, in some examples the plough-location-data can represent the location of one or more plough bodies. The field-location-data can include one or more of (i) field-boundary-location-data that defines the boundaries of the field that is to be ploughed, (ii) headland-boundary-location-data that defines the location of one or more headlands in the field that is to be ploughed, and (iii) obstacle-location-data that defines the locations of obstacles in the field, including subterranean obstacles such as stones and rocks. It will be appreciated that it can be desirable to change the depth of the plough bodies at these locations. The controller 360 can process the plough-location-data and the field-location-data to automatically set the pitch angle when the plough bodies are at these specified locations to: (i) decrease the pitch angle where the field-location-data represents a location at which the plough body is to be raised (for example approaching a field boundary from inside the field, approaching a headland, or approaching a buried rock), or (ii) increase the pitch angle where the field-location-data represents a location at which the plough body is to be lowered (for example approaching a field boundary from outside the field, leaving a headland, or having passed a buried rock). In this way, the pitch of the plough body can be automatically adjusted at predetermined locations in a field.

In some examples, the actuator mechanism 362 can be for adjusting a pitch angle of a single plough body, or a plurality of plough bodies. The plurality of plough bodies may be a subset or all plough bodies on a plough.

If the actuator mechanism 362 is for adjusting a pitch angle of a single plough body, then the control-data 364 that is processed for determining the associated actuator-control-signal 366 can be associated with the single plough body. Also, for such an example, the controller 360 may process plough-location-data that represents the location of the single plough body.

If the actuator mechanism 362 is for adjusting a pitch angle of a plurality of plough bodies, then the control-data 364 that is processed for determining the associated actuator-control-signal 366 can be associated with the plurality of plough bodies. For example, the control-data can comprise averaged-control-data that represents an averaged value of the control-data for the plurality of plough bodies. For instance, the averaged-control-data may comprise averaged-vertical-force-data, which is representative of an average of the upwards or downwards force experienced by the plurality of plough bodies. Also, for such an example, the controller 360 may process plough-location-data that represents an average location of the plurality of plough bodies, or the location of a predetermined one of the plurality of plough bodies (such as a centrally located one of the plough bodies).

In some examples of the present disclosure, the plough may not require a support/depth wheel at all. This can be the case where the down/up force on the plough body can be controlled and regulated by adjusting the pitch angle of the plough body. In this way, a separate mechanism (such as a depth wheel) may not be required to support the plough above the soil, nor to adjust the working depth of the plough body. In such an example, a hitch-sensor can provide the vertical-force-data. More particularly, the hitch-sensor can measure a force in the top link on a mounted plough. If depth sensors are associated with the frame, the plough can "float" in the soil at the correct depth. Advantageously, this can result in the transfer of no or a reduced vertical force to the tractor when working. For instance, the control-data can include the depth-control-data that is described above, such that an instruction to change the depth of the plough body relative to the ground can be used to adjust the pitch angle of the plough body.

The controller 360 can be implemented in a number of different ways. For instance, the controller can apply mathematical equations to the received control-data 364 (and any other data that it processes) in order to determine the actuator-control-signal 366. Alternatively, the controller 360 can use a database or a look-up table to determine an appropriate actuator-control-signal 366 for received ground-contour-data 364 (and any other data that it processes).

Figure 4A:
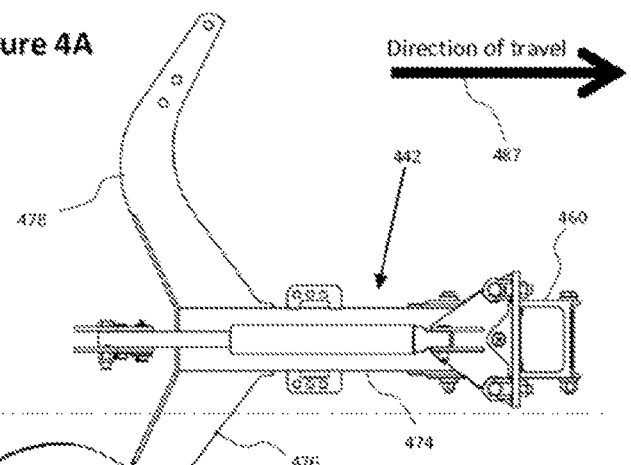
FIGS. 4A, 4B and 4C illustrate part of a plough that includes an actuator mechanism for adjusting a pitch angle of a plough body, wherein the plough body has a first pitch angle with respect a beam.
Figure 4B:
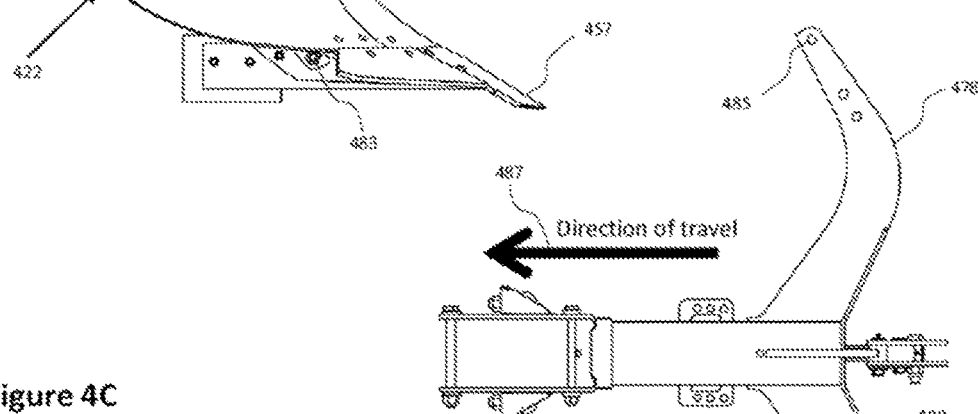
Figure 4C:
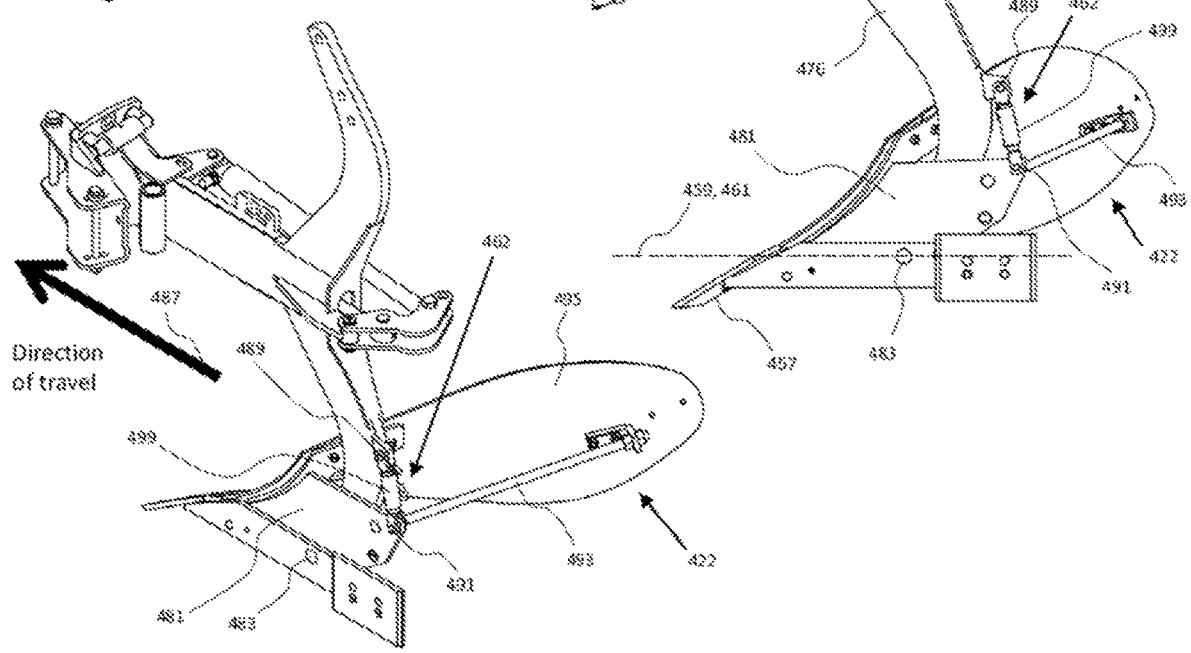
Figure 5A:
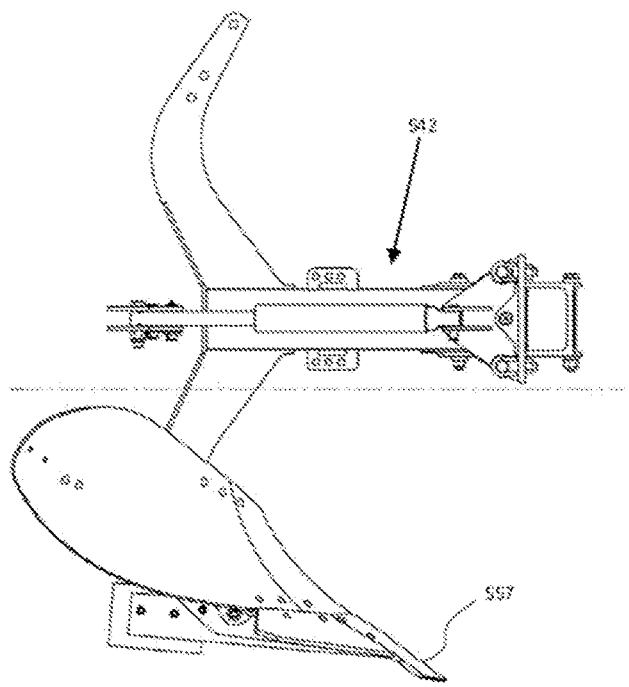
FIGS. 5A, 5B and 5C illustrate views of the same part of a plough that is illustrated in FIGS. 4A-4C, wherein the plough body has a second pitch angle with respect the beam.
Figure 5B:
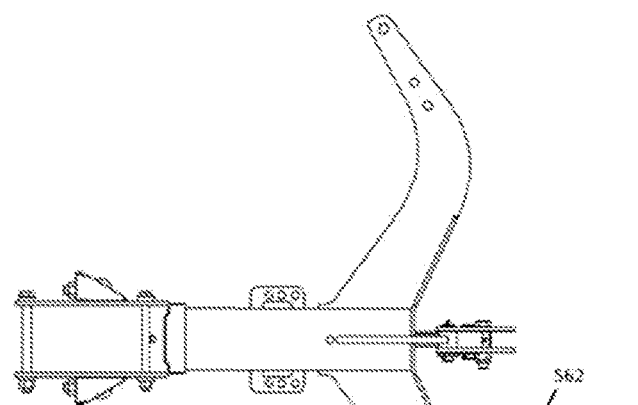
Figure 5C:
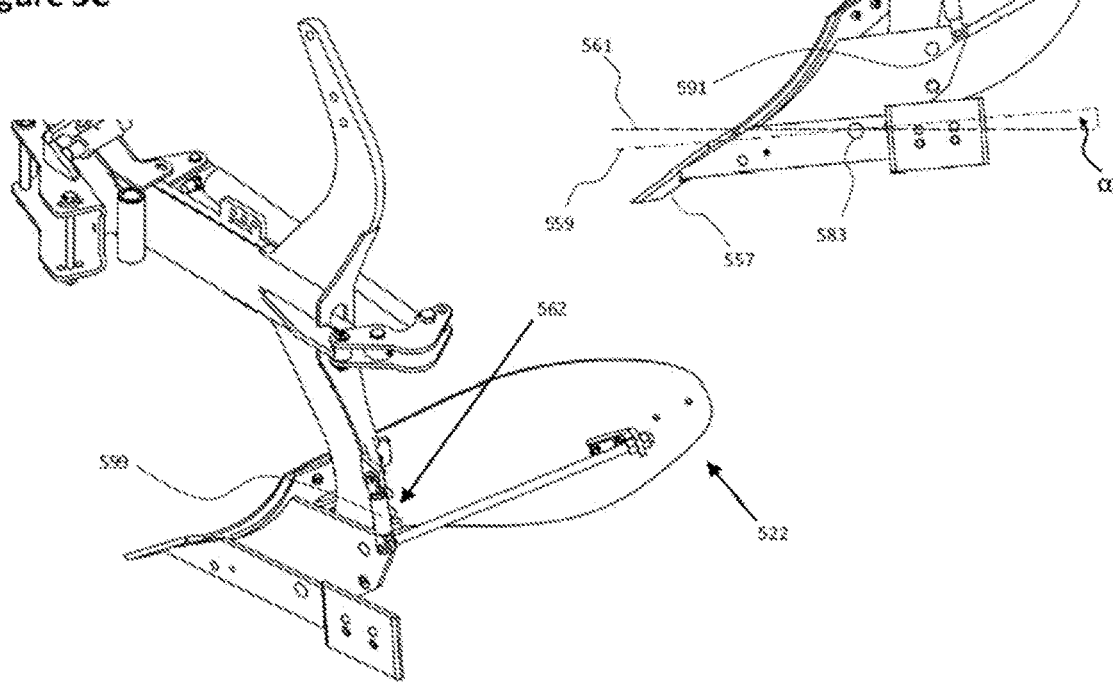

FIGS. 4A, 4B and 4C illustrate part of a plough that includes an actuator mechanism 462 for adjusting a pitch angle of a rotatable plough body 422. In FIGS. 4A, 4B and 4C the plough body 422 has a first pitch angle with respect to a beam 442. FIG. 4A shows a side view from a right-hand side of the plough relative to the direction of travel 487, FIG. 4B shows a side view from the left-hand side, and FIG. 4C shows a perspective view. FIGS. 5A, 5B and 5C are corresponding views that illustrate the plough body 522 having a second pitch angle with respect the beam 542. As will be described below, the actuator mechanism 562 can adjust the pitch angle of the plough body 522.

Returning to FIGS. 4A-4C, the beam 442 connects the plough body 422 to a frame (not shown) of a reversible plough. These figures show a beam housing 460 that provides a mechanical connection between the beam 442 and the frame.

The beam 442 has a substantially Y-shaped structure, which includes a central portion 474, a first beam arm 476 and a second beam arm 478. The central portion 474 of the beam 442 has a proximal end that is connected to the beam housing 460, and a distal end. The two beam arms 476, 478 extend from the distal end of the beam 442. The first beam arm 476 connects the plough body 422 to the central portion 474 of the beam 442. The second beam arm 478 connects a second plough body (not shown to assist with the clarity of the illustration) to the central portion 474 of the beam 442. The plough body 422 can be used to engage the soil and work the field when the reversible plough is in the first configuration. The second plough body (not shown) can be used to engage the soil and work the field when the reversible plough is in the second configuration.

In this example, the plough body 422 includes a frog 481, which is used to connect the plough body 422 to the beam 442. More particularly, the frog 481 is rotatably connected to the first beam arm 476 at a plough-body-pivot-point 483 such that the plough body 422 is rotatable about an axis that is transverse to the direction of travel of the plough, and is also generally horizontal. In this way, the plough body 422 is rotatable relative to the beam 442 and also rotatable relative to the frame (not shown), since the beam 422 can have a fixed orientation with respect to the frame when the plough body 422 is in a working position.

FIG. 4B also shows the location of a second-plough-body-pivot-point 485 on the second beam arm 478, which represents the location of a pivot point for a second rotatable plough body (not shown).

In this example, the actuator mechanism 462 includes a cylinder 499 for adjusting the pitch angle of the plough body 422. More particularly, the cylinder 499 can rotate the plough body 422 about the plough-body-pivot-point 483. One end of the cylinder 499 is connected to the beam at a beam-cylinder-connection-point 489—in this example the beam-cylinder-connection-point 489 is located on a lug of the first beam arm 476. The other end of the cylinder 499 is connected to the plough body 422 at plough-body-cylinder-connection-point 491—in this example the plough-body-cylinder-connection-point 491 is located on the frog 481 of the plough body 422. As the cylinder 499 extends and contracts, the plough body 422 rotates about the plough-body-pivot-point 483 such that the pitch angle of the plough body (relative to the beam 442) is adjusted.

A horizontal plane, with reference to the surface of the earth, is shown in FIG. 4B with reference number 461. A plane that includes the longitudinal axis of the plough body is shown in FIG. 4B with reference number 459. In FIGS. 4A-4C, the pitch angle is zero because the angle between the horizontal plane 461 and the longitudinal axis 459 of the plough body 422 is zero. As will be described below, the pitch angle can be increased by rotating the plough body 422 such that a point 457 of the plough body 422 is lowered. The pitch angle can be decreased by rotating the plough body 422 such that the point 457 of the plough body 422 is raised.

In this example, the plough body 422 also includes a stay 493 and a mouldboard 495. The stay 493 provides a rigid connection between the frog 481 and a distal portion of the mouldboard 495 such that the mouldboard 495 is sufficiently supported as it moves through the soil during a ploughing operation. The frog 481, the mouldboard 495 and the stay 493 all rotate together as parts of the plough body 422, when the plough body 422 rotates about the beam 442.

FIGS. 5A, 5B and 5C are corresponding views to that of FIGS. 4A, 4B and 4C, which illustrate the plough body 522 having a second pitch angle with respect the beam 542. Features of FIGS. 4A-4C that are also shown in at least one of FIGS. 5A-5C will be given corresponding reference numbers in the 500 series.

FIG. 5B shows a horizontal plane 561 and the longitudinal axis 559 of the plough body 522. In FIGS. 5A-5C, the pitch angle α is 5° because the angle between the horizontal plane 561 and the longitudinal axis 559 of the plough body 522 is 5°. When compared with FIGS. 4A-4C, the cylinder 599 has been retracted such that the plough-body-cylinder-connection-point 591 has rotated about the plough-body-pivot-point 583 in an anti-clockwise direction as it is shown in FIG. 5B. Therefore, the plough-body-cylinder-connection-point 591 moves upwards, the point 557 of the plough body 522 moves downwards, and the pitch angle of the plough body 522 is increased. Due to this increased pitch angle, the vertically downward component of the reactive force on the plough body 522 as it moves through the soil will be higher for the plough body 522 of FIGS. 5A-5C than it will be for the plough body of FIGS. 4A-4C.

In some examples, a stone trip mechanism can be used to provide the functionality of the actuator mechanism that adjusts a pitch angle of a plough body. For instance, such a stone trip mechanism can be used to move the plough body out of the way of a stone (or other subterranean obstacle). Such movement can also involve changing the pitch angle of the plough body. In which case, the controller that is described with reference to FIG. 3 can provide an actuator-control-signal to the stone trip mechanism such that it sets the pitch angle of the plough body based on control-data in the same way as described above.

Another example of an actuator mechanism is a spring element that is regulated by an electromagnetic force. A further still example of an actuator mechanism is a servo motor, for instance one that can rotate the plough body about a plough-body-pivot-point.

Figure 6:
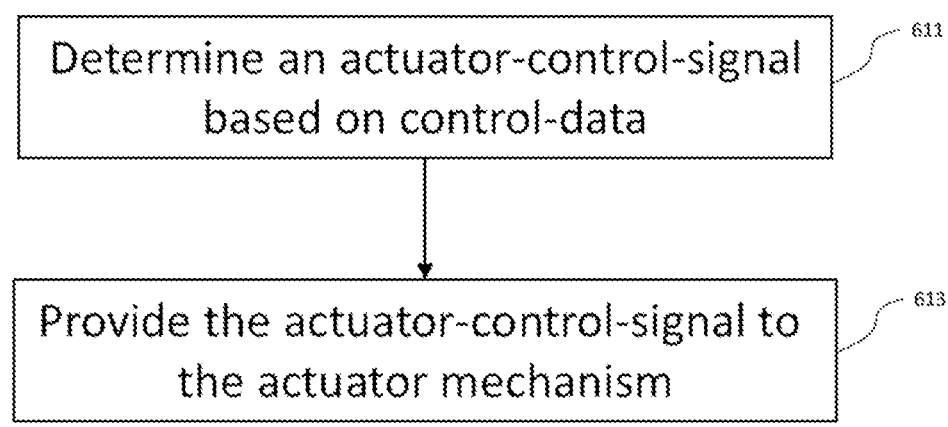
FIG. 6 illustrates an example embodiment of a method of operating a plough.

FIG. 6 illustrates an example embodiment of a method of operating a plough. As described above, the plough includes a plough body (which can be rotatable relative to a beam and/or a frame of the plough) and an actuator mechanism. The actuator mechanism can adjust a pitch angle of the plough body.

At step 611, the method determines an actuator-control-signal based on control-data. Numerous examples of control-data are described above with reference to FIG. 3. The actuator-control-signal is for setting the pitch angle of the plough body. In this way, the actuator-control-signal can be used to adjust the vertical force (lift or downforce) that is experienced by the plough body as it moves through the soil.

At step 613, the method provides the actuator-control-signal to the actuator mechanism. In this way, the pitch angle of the plough body can be adjusted automatically during a ploughing operation in a field. This can advantageously be used to improve the ploughing operation; for instance in terms of fuel efficiency and/or the consistency of furrows that are created by the plough.

Preferences and options for a given aspect, feature or parameter of the invention should, unless the context indicates otherwise, be regarded as having been disclosed in combination with any and all preferences and options for all other aspects, features and parameters of the disclosure.

The invention claimed is:

1. A plough comprising:
a beam;
a plough body;
an actuator mechanism that is configured to adjust a pitch angle of the plough body relative to the beam; and
a controller that is configured to:
   determine an actuator-control-signal for setting the pitch angle of the plough body based on control-data; and
   provide the actuator-control-signal to the actuator mechanism.

2. The plough of claim 1, wherein the plough body is rotatable about an axis that is transverse to the direction of travel of the plough.

3. The plough of claim 1, wherein the control-data comprises vertical-force-data, which is representative of an upwards or downwards force experienced by the plough body as it is working in a field.

4. The plough of claim 3, further comprising a force-sensor associated with the plough body, wherein the force-sensor is configured to provide the vertical-force-data.

5. The plough of claim 3, further comprising a ground-engaging-wheel-sensor associated with a ground-engaging wheel of the plough, wherein the ground-engaging-wheel-sensor is configured to provide the vertical-force-data.

6. The plough of claim 3, further comprising:
a hitch for coupling the plough to an agricultural vehicle; and
a hitch-sensor associated with the hitch, wherein the hitch-sensor is configured to provide the vertical-force-data.

7. The plough of claim 3, wherein the controller is configured to:
receive sensor-signals from more than one of a force-sensor, a ground-engaging-wheel-sensor, and a hitch-sensor; and
combine those signals in order to determine the vertical-force-data.

8. The plough of claim 1, wherein the control-data comprises depth-control-data that is representative of an instruction to change the depth of the plough body relative to a ground surface on which the plough is operating.

9. The plough of claim 8, wherein the controller is configured to determine the actuator-control-signal based on the depth-control-data in order to:
increase the pitch angle of the plough body if the depth-control-data represents an instruction to increase the depth of the plough body relative to a ground surface; and
decrease the pitch angle of the plough body if the depth-control-data represents an instruction to decrease the depth of the plough body relative to a ground surface.

10. The plough of claim 1, wherein the control-data comprises field-location-data that represents one or more properties of a field in which the plough is operating.

11. The plough of claim 10, wherein the field-location-data comprises one or more of:
(i) field-boundary-location-data that defines the boundaries of the field that is to be ploughed,
(ii) headland-boundary-location-data that defines the location of one or more headlands in the field that is to be ploughed, and
(iii) obstacle-location-data that defines the locations of obstacles in the field.

12. The plough of claim 1, wherein:
the actuator-control-signal is configured to set the pitch angle of the plough body such that an upwards or downwards force experienced by the plough body is higher than a lower-force-threshold and/or lower than an upper-force threshold;
the upper-force-threshold represents a maximum downwards force on the plough body, and/or
the lower-force threshold represents a minimum downwards force on the plough body or a maximum upwards force on the plough body.

13. The plough of claim 1, further comprising:
a frame;
wherein:
the plough body is connected to the frame by the beam;
the plough body is rotatably connected to the beam; and
the actuator mechanism is configured to adjust the pitch angle of the plough body by rotating it relative to the beam.

14. A computer-implemented method of operating a plough, the plough comprising:
a beam;
a plough body;
a computer configured to execute the computer-implemented method;
an actuator mechanism that is configured to adjust a pitch angle of the plough body relative to the beam;
wherein the method, when executed, comprises:
determining an actuator-control-signal for setting the pitch angle of the plough body based on control-data; and
providing the actuator-control-signal to the actuator mechanism.

* * * * *